US008745626B1

(12) United States Patent
Sandstrom

(10) Patent No.: US 8,745,626 B1
(45) Date of Patent: Jun. 3, 2014

(54) SCHEDULING APPLICATION INSTANCES TO CONFIGURABLE PROCESSING CORES BASED ON APPLICATION REQUIREMENTS AND RESOURCE SPECIFICATION

(71) Applicant: Mark Henrik Sandstrom, Jersey City, NJ (US)

(72) Inventor: Mark Henrik Sandstrom, Jersey City, NJ (US)

(73) Assignee: Throughputer, Inc., Jersey City, NJ (US)

( * ) Notice: Subject to any disclaimer, the term of this patent is extended or adjusted under 35 U.S.C. 154(b) by 15 days.

(21) Appl. No.: 13/717,649

(22) Filed: Dec. 17, 2012

(51) Int. Cl.
G06F 15/16 (2006.01)
G06F 19/00 (2011.01)
G06F 9/44 (2006.01)
G06F 9/46 (2006.01)

(52) U.S. Cl.
USPC ............. 718/102; 718/104; 712/15; 713/100; 709/226

(58) Field of Classification Search
None
See application file for complete search history.

(56) References Cited

U.S. PATENT DOCUMENTS

| 5,303,369 | A * | 4/1994 | Borcherding et al. | 718/104 |
|---|---|---|---|---|
| 5,931,959 | A * | 8/1999 | Kwiat | 714/48 |
| 6,289,434 | B1 | 9/2001 | Roy | |
| 6,289,440 | B1 * | 9/2001 | Casselman | 712/227 |
| 6,345,287 | B1 * | 2/2002 | Fong et al. | 718/102 |
| 6,912,706 | B1 * | 6/2005 | Stamm et al. | 716/117 |
| 7,389,403 | B1 * | 6/2008 | Alpert et al. | 712/10 |
| 7,518,396 | B1 * | 4/2009 | Kondapalli et al. | 326/38 |
| 2002/0056033 | A1 | 5/2002 | Huppenthal | |
| 2002/0112091 | A1 * | 8/2002 | Schott et al. | 709/328 |
| 2005/0235070 | A1 * | 10/2005 | Young et al. | 710/8 |
| 2005/0278551 | A1 * | 12/2005 | Goodnow et al. | 713/193 |
| 2006/0036774 | A1 * | 2/2006 | Schott et al. | 709/251 |
| 2006/0061794 | A1 * | 3/2006 | Ito et al. | 358/1.13 |
| 2006/0075265 | A1 | 4/2006 | Hamaoka et al. | |
| 2007/0220517 | A1 * | 9/2007 | Lippett | 718/102 |
| 2008/0189703 | A1 * | 8/2008 | Im et al. | 718/100 |
| 2009/0187756 | A1 * | 7/2009 | Nollet et al. | 713/100 |
| 2010/0049963 | A1 * | 2/2010 | Bell et al. | 713/100 |
| 2011/0119674 | A1 * | 5/2011 | Nishikawa | 718/103 |
| 2012/0221886 | A1 * | 8/2012 | Barsness et al. | 714/4.2 |
| 2012/0222038 | A1 * | 8/2012 | Katragadda et al. | 718/104 |
| 2013/0013903 | A1 * | 1/2013 | Bell et al. | 713/1 |

OTHER PUBLICATIONS

IEEE Transactions on Computers; Jean, J et al; Dynamic reconfirmation to support concurrent applications; vol. 48, Issue 6, pp. 591-602, Jun. 1999.

* cited by examiner

Primary Examiner — Meng An
Assistant Examiner — Benjamin Wu

(57) ABSTRACT

Systems and methods provide a processing task load and type adaptive manycore processor architecture, enabling flexible and efficient information processing. The architecture enables executing time variable sets of information processing tasks of differing types on their assigned processing cores of matching types. This involves: for successive core allocation periods (CAPs), selecting specific processing tasks for execution on the cores of the manycore processor for a next CAP based at least in part on core capacity demand expressions associated with the processing tasks hosted on the processor, assigning the selected tasks for execution at cores of the processor for the next CAP so as to maximize the number of processor cores whose assigned tasks for the present and next CAP are associated with same core type, and reconfiguring the cores so that a type of each core in said array matches a type of its assigned task on the next CAP.

17 Claims, 4 Drawing Sheets

SCHEDULING APPLICATION INSTANCES TO CONFIGURABLE PROCESSING CORES BASED ON APPLICATION REQUIREMENTS AND RESOURCE SPECIFICATION

CROSS-REFERENCE TO RELATED APPLICATIONS

This application claims the benefit of the following applications, each of which is incorporated by reference in its entirety:
[1] U.S. Provisional Application No. 61/587,634, filed Jan. 17, 2012;
[2] U.S. Provisional Application No. 61/721,686, filed Nov. 2, 2012; and
[3] U.S. Utility application Ser. No. 13/684,473, filed Nov. 23, 2012.

This application is also related to the following, each of which is incorporated by reference in its entirety:
[4] U.S. Utility application Ser. No. 13/184,028, filed Jul. 15, 2011;
[5] U.S. Utility application Ser. No. 13/270,194, filed Oct. 10, 2011;
[6] U.S. Utility application Ser. No. 13/277,739, filed Nov. 21, 2011; and
[7] U.S. Utility application Ser. No. 13/297,455, filed Nov. 16, 2011.

BACKGROUND

1. Technical Field

This invention pertains to the field of information processing, particularly to the field of techniques for improving information processing efficiency and performance through dynamically adapting processing resource types to match processing task types.

2. Descriptions of the Related Art

Conventional data processing hardware comprises several types of processor cores, e.g. Central Processing Units (CPUs), Digital Signal Processors (DSPs), Graphics Processing Units (GPUs) etc. and variations thereof. These core types are often designed either for generic program processing, i.e., are not optimal for any specific types of processing task, or are designed for and optimal for a particular types of processing tasks. Consequently, for any given data processing job, processing hardware made of generic processors will likely be less efficient than processing hardware made of specialized processors designed for the demands of the given job. On the other hand, processing hardware made of specialized processors will have a narrower range of suitable jobs for which such a specialized hardware is reasonably efficient, compared to hardware made of generic processors.

Still, the range of processing jobs for a given instance of processing hardware (e.g. a server blade used for computing Infrastructure-as-a-Service), especially over the lifetime of the given hardware instance, may comprise several types of jobs and their tasks, with each type best suited for its corresponding, distinct, processor type. Moreover, an array of processing hardware units (e.g. server blades, and/or cores within them, supporting computing Infrastructure-as-a-Service contracts) will likely be used for processing several types of jobs and tasks, each best suited for their corresponding processor core types, even at the same time instance.

However, it will be quite infeasible to predict ahead of time, e.g. when a given instance of processing (having a hardware with a processor core or array of them) is deployed for service, to know what would be the optimal type of core for any given processor instance, or the optimal breakdown of core types for a given array of processors—even on average over the lifetime of such processor(s), or, more relevantly as well as challengingly still, at any given instance of time while such processors are in service.

Consequently, the time varying sets of processing jobs for their target processing hardware units will, using conventional techniques, in practice be processed often by suboptimal types of processing cores. This leads to low overall data processing efficiency, e.g., in forms of executing tasks on core types that are worse suited for a given task than another type of core would be, or poor processing capacity utilization due to mismatches between the types of active tasks (in terms of the cores best suited for a given set of active jobs) and the types of their execution cores. Consequences of such conventional techniques include suboptimal performance (e.g. in terms of time and/or energy taken to process given jobs) and low cost-efficiency (volume of program processing on-time throughput per unit cost) of application processing.

For related art, the reader is referred to referenced publications as follows:
[X1] Partial Reconfiguration User Guide, a Xilinx, Inc. user document UG702 (v14.2) Jul. 25, 2012. Source: http://www.xilinx.com/support/documentation/sw_manuals/xilinx14_2/ug702.pdf (retrieved Nov. 29, 2012).
[X2] David Dye. Partial Reconfiguration of Xilinx FPGAs Using ISE Design Suite, a Xilinx, Inc. White Paper WP374 (v1.2), May 30, 2012. Source: http://www.xilinx.com/support/documentation/white_papers/wp374_Partial_Reconfig_Xilinx_FPGAs.pdf (retrieved Nov. 29, 2012).
[X3] Sébastien Lamonnier, Marc Thoris, Marlene Ambielle. Accelerate Partial Reconfiguration with a 100% Hardware Solution, Xcell Journal, Issue 79, Second Quarter 2012: pages 44-49. Source: http://www.xilinx.com/publications/archives/xcell/Xcel179.pdf (retrieved Nov. 28, 2012).
[X4] 7 Series FPGAs Configuration User Guide, a Xilinx, Inc. User Guide UG470 (v1.5) Nov. 5, 2012. Source: http://www.xilinx.com/support/documentation/user_guides/ug470_7Series_Config.pdf (retrieved Dec. 4, 2012).
[X5] Partial Reconfiguration Tutorial, PlanAhead Design Tool, a Xilinx, Inc. User Guide UG743 (v14.1) May 8, 2012. Source: http://www.xilinx.com/support/documentation/sw_manuals/xilinx14_1/PlanAhead_Tutorial_Partial_Reconfiguration.pdf
[X6] Simon Tam, Martin Kellermann. Fast Configuration of PCI Express Technology through Partial Reconfiguration, a Xilinx, Inc. Application Note XAPP883 (v1.0) Nov. 19, 2010. Source: http://www.xilinx.com/support/documentation/application_notes/xapp883_Fast_Config_PCIe.pdf (retrieved Dec. 10, 2012).
[A1] Deshanand Singh. Implementing FPGA Design with the OpenCL Standard, an Altera corporation White Paper WP-01173-2.0, November 2012. Source: http://www.altera.com/literature/wp/wp-01173-opencl.pdf (retrieved Nov. 29, 2012).

The reference [X1] provides user documentation for reconfiguring portions of programmable logic chips. The references [X2], [X3], [X4], [X5] and [X6] discuss implementation techniques for, under the control of user logic, reconfiguring portions (slots) in programmable logic chips, such as the core slots of the herein disclosed manycore array, with identified alternative hardware logic functions, such as the differing processing core types discussed, e.g. Application Specific Processors (ASPs). The reference [A1] discusses techniques translating functions of software programs to custom hardware logic implementations, e.g. ASPs. More specifically, concerning reconfiguring the logic of parts of programmable logic devices or field programmable gate array microchips (FPGAs), [X2] discusses techniques for how the FPGA logic can control reconfiguring sub-areas of the FPGA, while [X3] details an implementation of an FPGA logic design to control an "Internal Configuration Access Port" (ICAP) of a Xilinx FPGA to reconfigure a particular area of the FPGA with an identified logic configuration bitstream; see in particular pp. 46-47 of the source journal of [X3] referring to the FIGS. 2 and 3 of the article, under its captions "Reconfiguration Process" and "Inside ICAP". [X4] describes interacting with said ICAP (specifically, ICAPE2 in Xilinx Series 7 FPGAs) by user designed logic, including specifying a configuration bitstream (by its start address in a non-volatile memory storing multiple alternative full and/or partial configuration bitstreams) to be used for a (partial) reconfiguration of the FPGA; see in particular subsections 'IPROG' and 'WBSTAR' on pp. 122-123, and "IPROG Reconfiguration" and "IPROG Using ICAPE2" on pp. 124-125. [X5] provides documentation for creating partial reconfiguration logic programming bit files, while [X6] describes techniques for partial reconfiguration of the logic etc. in a defined sub-area of an FPGA chip, while keeping the functions of the chip not subject to any given partial reconfiguration process un-impacted during such partial reconfigurations. [A1] discusses an OpenCL compiler for translating software (C-language) program functions to hardware that implements each operation of such functions.

These related art publications however do not enable adapting the types of processing resources in a given resource pool according to the processing load and type demand variations presented by a group of applications configured to dynamically share the given pool of processing resources. Innovations are thus needed to accomplish that goal.

SUMMARY

The invented systems and methods provide a processing task load and type adaptive manycore processor architecture, enabling flexible, high-performance and cost-efficient information processing. In embodiments of the invention, the processing tasks or processing applications as discussed herein refer to segments or instances of executable programs for the processing cores of the system, and such an application or task may, at its execution layer, comprise, in certain scenarios even exclusively, a file that reconfigures a core slot within a manycore processor according to an embodiment of invention into a hardware logic design that performs a desired information processing function of its associated piece of software program, e.g. processing of its input data to produce requested results such as output data, without a need for runtime software involvement such as executable program instructions that would be needed by a conventional processor core.

An aspect of the invention provides a processing task type adaptive manycore processor system for executing time variable sets of processing software program tasks of differing types on their assigned cores of matching types, the system comprising a processing core array, wherein the hardware logic design of any given core slot of the array is subject to reconfiguration to accommodate a processing task assigned for execution at the given core slot for an upcoming core allocation period (CAP). Typically, such reconfiguration of the hardware logic of a given core slot takes place when the given core slot gets assigned a new processing task that demands a different processing core type than the task presently assigned for the given core slot. Various embodiments of such a manycore processor system further comprises hardware logic for controlling the reconfiguration of a given processing core slot of the array into a demanded core type based on a core type associated with a processing task assigned for execution at the given core slot for the upcoming CAP. Furthermore, said demanded core type, in certain operating scenarios, is a direct custom hardware logic implementation of a processing software program task assigned for execution at the given core for the upcoming CAP.

Another aspect of the invention involves, in a processing task load and type adaptive processing core array, a method of executing time variable sets of information processing tasks of differing types on their assigned cores of matching types, with a matching type of a core for a given task referring to processing core deemed optimal for executing the given task, and such core type may, in various scenarios, comprise a CPU, DSP, GPU, or Application Specific Processor (ASP) of a particular design in case of each of such processor core categories. Various embodiments of such a method furthermore involve one or more steps as follows: a) for successive core allocation periods (CAPs), selecting, from a set of tasks hosted on the processing core array, specific processing tasks for execution on the cores of the array for an upcoming CAP at least in part based on core capacity demand expressions associated with the set of processing tasks, b) assigning the selected tasks for execution at individual core slots of the array for the next CAP in a manner to maximize, within the array, a number of core slots whose assigned task for the present and the next CAP are associated with same processing core type, and c) configuring, as necessary, the array of processing cores so that a core type of any given core slot in said array matches a type of a task assigned for execution on the given core slot for the upcoming CAP. Moreover, in certain scenarios, the core type matching a given information processing task is a direct custom hardware logic implementation of the processing task assigned for execution at the given core slot of the array for the upcoming CAP.

A yet another aspect of the invention provides a system for assigning and adapting types of information processing resources, with such a system comprising: 1) hardware logic for repeatedly assigning an array of processor core slots among a set of processing applications based at least in part on processor core capacity demand indications of at least some of said applications, and 2) hardware logic for controlling a configuring of a type for a given processing core slot within said array based on an instance of an application assigned, by the hardware logic for assigning, for processing by the given core slot. Various embodiments of such a system further comprise one or more features whereby: a) the processor core capacity demand indications, of at least one of the applications, includes an indication of a type of a processor core demanded by said one application, b) the hardware logic for controlling controls the configuring at least in part based on a processing core type associated with the instance of an application assigned for processing by the given core slot, c) the logic for assigning, once having created a new allocation of the core slots among the applications to replace a present allocation of the core slots among the applications: i) maximizes a number of core slots within the array for which the new and the present allocations have a processing application with same core type demand, and/or ii) keeps, across the array of core slots, any instances of applications present both in the present and the new allocations assigned to a constant core slot among the array, d) the processor core capacity demand indications, in case of at least one application among the set, is based on i) an amount of input data said one application presently has available to process and/or ii) a number of tasks and/or instances of said one application that presently have input data available to process, e) a processing application among the set can be a task, a function, a procedure, a defined code or instruction sequence, an actor, a thread, or an instance of a software program, and/or f) a given processing core slot among the array is configured, under the direction of the hardware logic for controlling, to provide a direct hardware logic implementation of an information processing function of the application assigned for processing by the given core slot. Moreover, in certain embodiments, said direct hardware logic implementation performs the information processing function of said application without a need for executable program instructions or any other software involvement.

A yet further aspect of the invention provides a method for assigning and adapting types of data processing resources, the method comprising: 1) assigning an array of processor core slots among a set of processing applications based at least in part on processor core capacity demand indications of at least some of said applications, and 2) controlling a configuring of a type for a given processing core slot within said array at least in part based on an instance of an application assigned for processing by the given core slot. Various embodiments of such a method involve one or more further steps and features by which: a) the processor core capacity demand indications, of at least one of the applications, includes an indication of a type of a processor core demanded by said one application, b) the controlling is done based at least in part on a processing core type demanded by the instance of an application assigned for processing by the given core slot, c) the step of assigning, once having created a new allocation of the core slots among the applications to replace a present allocation of the core slots among the applications: i) maximizes a number of core slots within the array for which the new and the present allocations have an application with same core type demand, and/or ii) keeps, across the array of core slots, any instances of applications present both in the present and the new allocations assigned to a constant core slot among the array, d) the processor core capacity demand indications, in case of at least one application among the set, is based on: i) an amount of input data said one application presently has available for processing, and/or ii) on a number of instances and/or tasks of said one application that presently have input data available to process, e) a processing application among the can be a task, a function, a procedure, a defined code or instruction sequence, an actor, a thread, or an instance of a software program, f) at least one of the steps of assigning and controlling is done by hardware logic that operates without runtime software involvement and/or g) a given processing core slot within the array is configured, via the step of controlling, to implement directly in hardware logic an information processing function of the application assigned for processing by the given core slot, wherein furthermore, in certain embodiments, such hardware logic directly implementing said information processing function of the application performs such function without a need for executable program instructions or any other software involvement.

DETAILED DESCRIPTION

Figure 1:
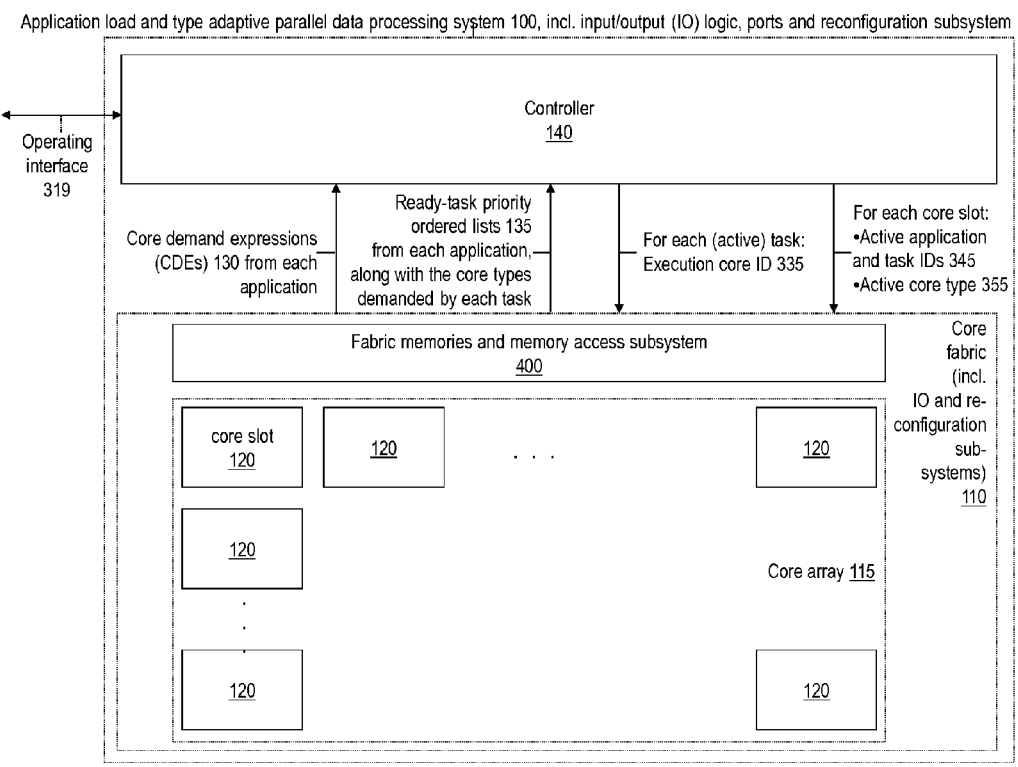
FIG. 1 shows, in accordance with an embodiment of the invention, a functional block diagram for an application program load and type adaptive parallel data processing system, comprising a manycore fabric, member core slots of which are dynamically space and time shared among processing tasks of a set of software programs, and which are assigned, and if needed, reconfigured to, their appropriate core types according to the types of tasks selected for execution on the fabric.

FIGS. and related descriptions below provide specifications for embodiments and aspects of an application program task load and type adaptive manycore processor, supporting execution of multiple concurrent application programs and their tasks and instances thereof on execution cores of matching types.

The references [1]-[3] provide a multistage manycore processing architecture, where from the set of pipelined and/or parallelized application programs sharing such a multistage parallel processing system, typically one task per each of the applications is located at each of the processing stages. Where the application type adaptive manycore processor systems per this specification is used in such multistage architectures, per each given processing stage, typically thus just one processor core type is needed per each of the applications sharing the given processing system. Accordingly, in such embodiments of system 100 (FIG. 1), the application ID# assigned for processing by each given core slot 120 of a given manycore processor system 100 can be used as such (without concern of tasks within the application) for controlling the selection of the demanded 355 core type for each of the core slots of the given processing stage 100. While in various embodiments, individual instances of processor systems 100 are able to support multiple task types per each of the multiple application programs hosted on a given processor system 100, to better highlight the application task type adaptive processing aspect of the invention, embodiments of the processors 100 studied herein are assumed to host just one task type per each of the applications hosted on a given individual processor 100; i.e., in these embodiments, the identifying of a processing application (without concern for a task or instance within it) for a given core slot is sufficient to allow properly direct the selecting of the type of processing core for the given slot. Nevertheless, even with just one task type per application per a system 100, multiple tasks per any given application can be supported via arranging systems 100 via multi-stage processing architectures, e.g. per the references [1]-[3] (note that in the references [1]-[3], the processing stages, containing the actual manycore processor systems, are identified with reference characters 300). Due to the focus in this detail description on embodiments of manycore processor systems 100 where each of the application programs sharing a given processor 100 has just one program task configured to run on that given processor 100, the notions of an application program and a task (of an application program) are used interchangeably in this specification, with the term application commonly referring to a task of an application program hosted on the processor instance under study. In various embodiments though, more than one, up to all, of the application program tasks running on a given processor 100 can be tasks of the same application program, and in such embodiments, in particular ones where all the application tasks on a given processor are tasks of the same application program, the elements 220 (FIG. 2), though they are in this description commonly regarded as different applications, refer to different tasks of the same application, which different tasks can demand their own specialized core types even though they belong to same application. However, across the range of possible embodiments and scenarios, from a case where there is just one task per each of the multiple applications (through potentially multiple instances per each application) per a processor 100 instance to the case where there are multiple tasks (and instances thereof) of a single application on a processor 100, the identifying of a given selected program element 220 (FIG. 2) to execute for a period of time on a given core slot 120 of a manycore processor 100 allows determining a desired execution core type for such selected program element, e.g. to provide an resource-usage or runtime optimized execution of each given program element.

General notes about this description (incl. text in the drawings):

For brevity: 'application (program)' is occasionally written in as 'app', 'instance' as 'inst' and 'application-task/instance' as 'app-task/inst'.

Receive (RX) direction is toward the cores of a manycore processor 100, and transmit (TX) direction is outward from the cores.

Terms software program, application program, application and program are generally used interchangeably in this description, and each generally refer to any type of computer software able to run on data processing systems based on the architecture.

Term 'task' in this description refers to a part of a program, and covers the meanings of related terms such as actor, function, procedure, thread etc.

References to a "set of" units of a given class, such as programs, logic modules or memory segments can, depending on the nature of a particular embodiment or operating scenario, refer to any positive number of such units.

Terms "core slot", "processing core" or simply "core"—all denoted by the element 120 in FIG. 1—are used herein mostly interchangeably; "core slot" refers generically to any of the cores the array 115 whereas "(processing/execution) core" assumes that the core instance on the given slot is configured for a certain type (e.g. GPU) to match the processing task assigned to it for a given period of time. As well, phrases "information/data processing", "program/application/task processing/execution" or "processing" are also used herein largely interchangeably; each refers to manipulation of input data elements by a processing core to produce output data elements at least in part according to the application program task assigned to the given core (wherein the input and output data elements can include both data stored in memories as well as sent and received through I/O ports of the system 100).

The detail descriptions below assume there to be X IO ports, Y core slots on a processor 100, M application programs and up to N instances per each application configured for a processor 100, and up to T tasks (or processing stages) per a given application (instance), wherein the capacity parameters X, Y, M, N and T are some positive integers, and wherein the individual ports, cores, applications, tasks and instances, are identified with their ID#s ranging from 0 to said capacity parameter value less 1 for each of the measures (ports, cores, apps, instances, tasks or processing stages).

The invention is described herein in further detail by illustrating the novel concepts in reference to the drawings. General symbols and notations used in the drawings:

Boxes indicate a functional digital logic module.

Arrows indicate a digital signal flow. A signal flow may comprise one or more parallel bit wires. The direction of an arrow indicates the direction of primary flow of information associated with it with regards to discussion of the system functionality herein, but does not preclude information flow also in the opposite direction.

A dotted line marks a border of a group of drawn elements that form a logical entity with internal hierarchy, such as the modules constituting the multi-core processing fabric 110 in FIG. 1.

Lines or arrows crossing in the drawings are decoupled unless otherwise marked.

For clarity of the drawings, generally present signals for typical digital logic operation, such as clock signals, or enable, address and data bit components of write or read access buses, are not shown in the drawings.

FIG. 1 provides, according to an embodiment of the invention, a functional block diagram for an embodiment of the invented multi-core data processing system dynamically shared among data processing tasks and/or instances of application software programs, with capabilities for application processing load adaptive allocation of the cores among the software applications configured for the system, as well as for dynamically reconfiguring the core slots according to the types of the processing tasks assigned to any given core slot of the multi-core fabric.

The discussion below details an illustrative example embodiment of the aspects of the invention illustrated in FIG. 1.

As illustrated in FIG. 1, the processor system 100 comprises an array 115 of processing core slots 120, which are dynamically shared among a the locally hosted tasks of a set of application programs configured to run on the system 1. Any of the core slots 120 of a system 100 can be configured to comprise any types of software program processing hardware resources, e.g. central processing units (CPUs), graphics processing units (GPUs), digital signal processors (DSPs) or application specific processors (ASPs) etc., and, in programmable logic (FPGA) implementation, the core type for any core slot 120 is reconfigurable per expressed demands of the active app-tasks. The receive (RX) logic at application specific input data receive modules write their associated applications' capacity demand indicators 130 to the controller 140. Each of these indicators 130, referred to herein as core-demand-figures (CDFs), express how many cores 120 their associated app-task is presently able utilize for its ready to execute instances. Moreover, the RX logic for the individual applications write the application CDFs to a look-up-table (LUT) at the controller per Table 1 format, as described later on in this specification under heading "Summary of process flow and information formats.". Furthermore, these capacity demand expressions from the processing applications, written to controller 140 by the RX logic of each locally hosted app-task, include a list 135 identifying its ready instances in a priority order per LUT of Table 3 format, also described later on in this specification under the heading "Summary of process flow and information formats.". In certain embodiments, the list 135 identifying ready tasks or instances of any given application include expressions of the demanded target processing core type for any given task or instance of the application on the list. In other embodiments, e.g., those discussed herein at greater detail where there is just one task type per any one of the applications hosted on the given processor 100, the application ID# by itself is used to identify the core type demanded by any instance of the given application placed for execution at a given core slot of the processor for a given core allocation period.

A hardware logic based controller module 140 within the processor system 100, through a repeating process, allocates and assigns the cores 120 of the processor 100 among the set of applications 210 (FIG. 1) and their instances, at least in part based on the CDFs 130 of the applications. In a particular implementation, this application instance to core assignment process 300 (see FIGS. 2 and 3) is exercised periodically, e.g. at intervals such as once per a defined number (for instance 64, 256 or 1024, or so forth) of processing core clock or instruction cycles. The application instance to core assignment algorithms of the controller 140 produce, for the application instances on the processor 100, identification 335 of their execution core slots (if any, at any given time), as well as for the cores of the fabric 115, identification of their respective app-inst:s for execution 345 and their demanded target core types (e.g. CPU, DSP, GPU, ASP for a particular function etc.) 355. The app-inst to core mapping info 345 also directs the muxing of input data from an input buffer of an appropriate app-inst to each core of the array 115. The app-inst to core mapping info 335 is also used to configure the muxing of the input data read control signals from the core array 115 to the input data buffers of the app-inst assigned for any given core.

Note that the verb "to assign" is used herein reciprocally, i.e., it can refer, depending on the perspective, both to assignment of cores 120 to app-inst:s 240 (see FIG. 1) as well as to mapping of app-inst:s 240 to cores 120. This is due to that the allocation and mapping algorithms of the controller 140 cause one app-inst 240 to be assigned per any given core 120 of the array 115 by each run of such algorithms 300 (see FIGS. 2 and 3). As such, when it is written here, e.g., that a particular core #x is assigned to process a given app-inst #y, it could have also been said that app-inst #y is assigned for processing by core #x. Similarly, references such as "core #x assigned to process app-inst #y", could be written in the (more complex) form of "core #x for processing app-inst #y assigned to it", and so forth.

Figure 2:
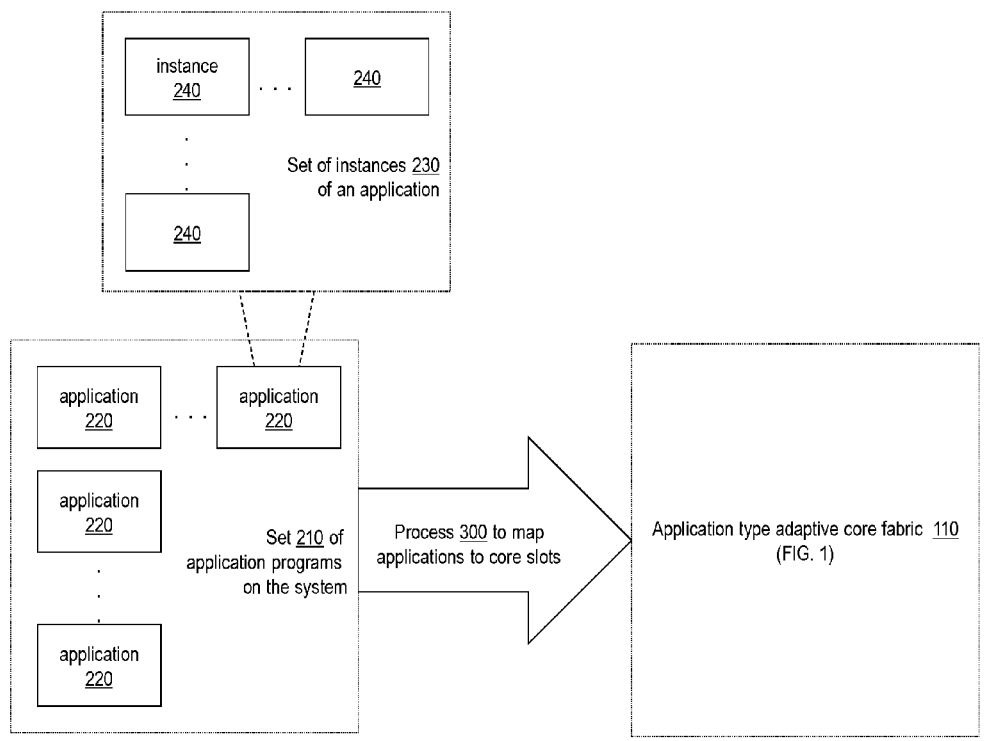
FIG. 2 provides a context diagram for a process, implemented on a system per FIG. 1, to select and map active tasks of application programs configured to run on the system to their target processing cores of appropriate types, in accordance with an aspect of the invention.
Figure 3:
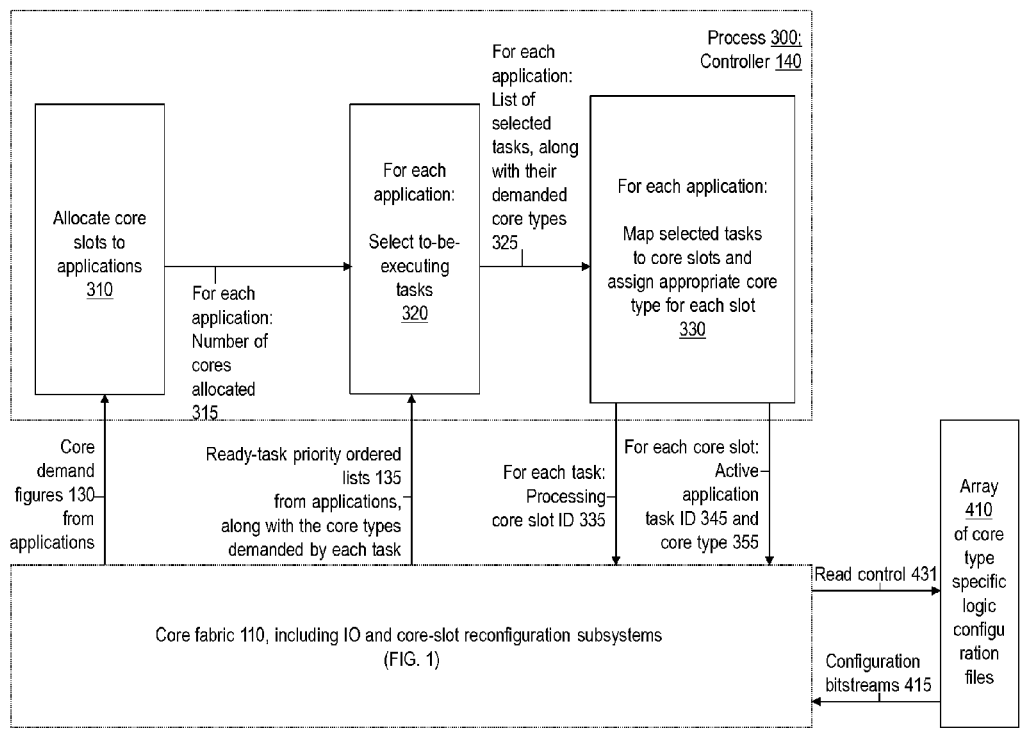
FIG. 3 illustrates, in accordance with an aspect of the invention, a logic system block diagram and major steps for a process per FIG. 2.

The controller module 140 is implemented by digital hardware logic within the system, and the controller exercises its repeating algorithms, including those of process 300 per FIGS. 2-3, without software involvement. Note that the concept of software involvement as used in this specification relates to active, dynamic software operation, not to configuration of the hardware elements according to aspects and embodiments of the invention through software where no change in such configuration is needed to accomplish the functionality according to this specification.

FIG. 2 illustrates, according to an embodiment of the invention, context for the resource management process 300 performed by the controller logic 140 of the system 100. The discussion below details an illustrative example embodiment of this aspect of the invention.

The process 300 repeatedly selects and places the to-be-executing instances 240 of the set of locally hosted app-tasks 210 to their assigned target core slots 120, as well as determines, for the core-slot reconfiguration subsystem of the processor 100 (FIGS. 3 and 4), the demanded core types for the core slots of the array 115, along with notifications of changes in the demanded core type for each given core slot.

Per FIG. 2, each individual app-task 220 configured for a processor system 100 has its collection 230 of its instances 240, even though for clarity of illustration in FIG. 2 this set of instances is shown only for one of the applications within the set 210 configured for a given instance of system 100. Recalling that in a multi-stage parallel processing architectures there will be one task per application program per processing stage, in the following discussion (incl. text in FIGS.) of internal aspects of the processor systems 100 (at an assumed multi-stage architecture), references to 'application' (app) have a meaning of a locally hosted application task (app-task). Note also that, among the applications 220 there can be supervisory or maintenance software programs for the system 100, used for instance to support configuring other applications 220 for the system 100, as well as provide general functions such as system boot-up and diagnostics.

In the context of FIGS. 1-2, FIG. 3 provides a data flow diagram for an embodiment of the process 300, which periodically selects app-inst:s for execution, places each selected-to-execute app-inst 240 within the sets 230 to one of the cores 120 within the array 115 and provides control for core slot reconfiguration operations, to provide a matching execution core type for each selected and placed app-inst.

FIG. 3 presents, according to an embodiment of the invention, major phases of the app-inst to core slot mapping process 300, used for maximizing the (value-add of the) application program processing throughput of the manycore fabric 110 shared among a set 210 of software programs. The discussion below details an illustrative example embodiment of this aspect of the invention.

The process 300, periodically selecting and mapping the to-be-executing instances of the set of applications to the array of processing cores within the processor 100, involves the following steps:
(1) allocating 310 the array 115 of cores among the set of applications 210, based on CDFs 130 and core entitlements (CEs) of the applications, to produce for each application 220 a number of cores 120 allocated to it 315 (for the time period, referred to as a core allocation period (CAP), in between the current and the next run of the process 300); and
(2) based at least in part on the allocating 310, for each given application that was allocated at least one core: (a) selecting 320, according to the app-inst priority list 135, the highest priority instances 325 of the given application for execution on the upcoming CAP corresponding to the number of cores allocated to the given application, and (b) mapping 330 each selected app-inst to one of the available cores of the array 115, to produce, i) per each core of the array, an identification 345 of the app-inst that the given core was assigned to, along with the target core type 355 corresponding to its assigned task, as well as ii) for each app-inst selected for execution on the fabric 115, an identification 335 of its assigned core slot.

The periodically produced and updated outputs 335, 345, 355 of the controller 140 process 300 will be used for periodically updating 335, 345 the connectivity through the input data buffer to core multiplexers as well as the fabric memory access subsystem 400, as well as, directing 355 reconfiguration of the hardware logic of the core slots.

Figure 4:
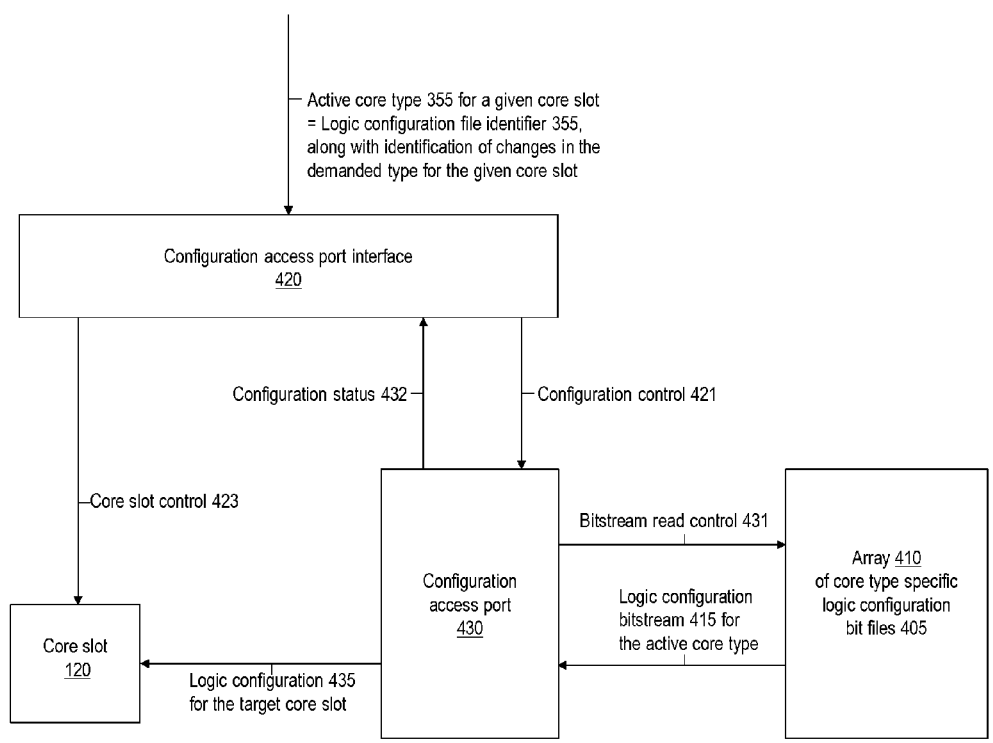
FIG. 4 shows, in accordance with an aspect of the invention, functional logic block diagram for a subsystem for controlling reconfiguring a core slot of the manycore fabric of the system per FIG. 1 to match the type of an instance of application program assigned for the core slot for a given period of time.

FIG. 4 shows, in accordance with an aspect of the invention, functional logic block diagram for a subsystem for controlling reconfiguring a given core slot 120 of the manycore processor system 1 to match the type of an application program (or task thereof) assigned for the given core slot for a given period of time. In an embodiment studied here in greater depth, the core type to match the type of an application instance assigned to a given core slot is identified by the algorithm 330 (FIG. 3) directly as the core type 355 for the given core slot. Moreover, in certain embodiments, the ID# of any given application assigned to a given core slot is usable directly for selection of the appropriate configuration file for a target core slot to which the application of the given ID# is assigned for execution.

Per FIG. 4, a memory 410 is used to store a set of configuration files 405 for programming the reconfigurable hardware logic for core slots 120 of the manycore fabric 115 of the processor 100 to make a given core slot function as a processor core type associated with a given file 405. The cores slots 120 in the herein studies embodiments of a processor 100 are on an programmable logic chip, e.g. Field Programmable Gate Array (FPGA) microchip supporting reconfiguration of specified logic areas within the chip with identified logic programming files, for instance per the references [X1]-[X6] discussed in the Related Art section.

In the specific logic system illustrated in FIG. 4, the processor system controller 140 (FIG. 3) identifies 355, through a configuration access port interface 420 within user logic of the FPGA chip of the processor 100, and per a given target core slot 120 subject to a change in the processing core type demanded between its latest and new assigned application 220, the type of the core to which the hardware logic of given core slot is to be reconfigured. The interface logic 420, in turn, after detecting or being notified of a change in demanded core type 355 for a particular core slot 120, identifies 421 for the configuration access port 430 of the FPGA chip the logic configuration file 405 instance needed for reconfiguring the given target core slot, and provides a command 421 for the module 430 to carry out such partial reconfiguration within the FPGA. The configuration access port 430 interacts 431 with the memory 410 to retrieve 415 the demanded configuration file for such target core slot. Please see the reference [X4], especially pp. 124-125, for details of a particular implementation possibility; in such implementation scenario, the value for Warm Boot Start Address (WBSTAR) register can be used to identify the file 405 for the partial reconfiguration demanded to reprogram the hardware logic of a given target core slot 120 to the demanded 335 core type to match the processing application assigned for such target core slot, and the issuing of IPROG command can be used to launch the demanded reconfiguration 415, 435 with the identified partial reconfiguration file. Note that in these implementation scenarios, the individual partial logic reconfiguration files 405 also identify their target core slot; in such scenarios, for each core type, an individual file 405 is needed per each possible target core slot among the array 115. The configuration access port 430 further provides for the interface logic 420 status 432 of the demanded core slot logic reprogramming, including of its completion. Based on the timing of control 421 and status 432 of the configuration access port, the interface logic 420 provides any necessary control 423, such as reset, for the core slot instance subject to the reconfiguration. In an embodiment, such control 423 provided during the reconfiguration of a given core slot prevents unintended interactions between that core slot and the rest of the system 100, by keeping the inputs to and outputs from (other than the inputs and any outputs used for reconfiguration) the core slot under reconfiguration in their passive values. The reference [X3] provides specification for a possible implementation of such control and status signals.

Furthermore, besides the identification of a core type for a given core slot, the information flow 355 includes an identification of changes in the demanded core type for the given core slot. In an alternative embodiment, the logic 420 internally detects the events of changes in the demanded core type for the given core slot. This information about change events in the core type demanded for a given core slot is used by the logic 420 (FIG. 4) to launch and control, via control signals 421 and 423, the logic reconfiguration process when actually needed, i.e., when the core type for the given slot changes between two successive core allocation periods, while otherwise avoiding reconfiguring the logic of the core slot.

Note that the techniques per above, along with those per e.g. [A1] for synthesizing segments of software programs 220 into custom hardware logic designs, referred to here as ASPs, enable creating logic configuration files 405 such that configure the programmable logic of their target core slot 120 into a hardware logic implementation that performs the information processing function directly according to their source software program (segment) without a need for any executable program instructions. I.e., such ASPs, for which the techniques described herein enable configuring processing cores as demanded, are able to produce the intended processing results of their associated software programs or tasks thereof without any software overhead (including without fetching, caching, scheduling, pipelining or serially processing any instructions), by processing the appropriate input data directly in the custom hardware logic to produce the requested results, e.g. output data. For instance, an ASP is able to process in parallel custom hardware logic gates all of the functionality of the source software program for the ASP that do not need to be processed sequentially. Such ASPs, compared to conventional processor cores that rely on sequences of program instructions for controlling their operation, can thus significantly speed up a given information processing function as well as improve the energy etc. resource efficiency of the processing, in particular when used in combination with the other application load and type adaptive processing techniques per this description including its incorporated references.

Module-Level Implementation Specifications for the Application Instance to Core Placement Process:

The steps of the process 300 (FIG. 3), according to an embodiment of the invention, are described in the following. In the herein studied embodiments, the process 300 is implemented by hardware logic in the controller module 140 of a processor 100 per FIG. 1.

Objectives for the core 120 allocation algorithm 310 include maximizing the processor 100 core utilization (i.e., generally minimizing, and so long as there are ready app-inst:s, eliminating core idling), while ensuring that each application 220 gets at least up to its entitled (e.g. a contract based minimum) share of the processor core capacity whenever it has processing load to utilize such amount of cores. Each application configured for a given manycore processor 100 is specified (via management interface 319) its entitled quota of the cores, at least up to which quantity of cores it is to be allocated whenever it is able to execute on such number of cores in parallel; sum of the applications' 210 core entitlements (CEs) is not to exceed the total number of core slots in the given processor 100. Accordingly, each application program on the processor 100 gets from each run of the algorithm 310:

(1) at least the lesser of its (a) CE and (b) Core Demand Figure (CDF) 130 worth of the cores (and in case (a) and (b) are equal, the 'lesser' shall mean either of them, e.g. (a)); plus (2) as much beyond the amount of cores allocated by the above step (1) to match its CDF as is possible without violating condition (1) for any application on the processor 100; plus (3) the application's even division share of any cores remaining unallocated after conditions (1) and (2) are satisfied for all applications 210 sharing the processor 100.

The algorithm 310 allocating cores 120 to application programs 220 is started by at a timing control signal launching the process 300, and it runs as follows:

(i) First, any CDFs 130 by all application programs up to their CE of the cores within the array 115 are met. E.g., if a given program #P had its CDF worth zero cores and entitlement for four cores, it will be allocated zero cores by this step (i). As another example, if a given program #Q had its CDF worth five cores and entitlement for one core, it will be allocated one core by this stage of the algorithm 310. To ensure that each app-task will be able to at least communicate with other tasks of its application etc. relevant parties at some defined minimum frequency, the step (i) of the algorithm 310 allocates for each application program, regardless of the CDFs, at least one core once in a specified number (e.g. sixteen) of process 300 runs.

(ii) Following step (i), any cores remaining unallocated are allocated, one core per program at a time, among the application programs whose demand 130 for cores had not been met with the amounts of cores so far allocated to them following any preceding iterations of this step (ii) within the given run of the algorithm 310. For instance, if after step (i) there remained eight unallocated cores and the sum of unmet portions of the CDFs of the programs 210 was six cores, the program #Q, based on the results of step (i) per above, will be allocated four more cores by this step (ii) to match its CDF.

(iii) Following step (ii), any processing cores still remaining unallocated are allocated among the application programs evenly, one core per program at time, until all the cores of the array 115 are allocated among the set of programs 210. Continuing the example case from steps (i) and (ii) above, this step (iii) will allocate the remaining two cores to certain two of the programs (one for each). Any programs with zero existing allocated cores are prioritized in allocating the remaining cores at the step (iii) stage of the algorithm 310.

Moreover, the iterations of steps (ii) and (iii) per above are started from a revolving application program ID#s within the set 210, e.g. so that the application ID# to be served first by these iterations is incremented by one (and returning to ID#0 after reaching the highest application ID#) for each successive run of the process 300 and the algorithm 310 as part of it. Furthermore, the revolving start app ID#s for the steps (ii) and (iii) are kept at offset from each other equal to the number of app:s sharing the processor divided by two.

The allocating of the array of cores 115 by the algorithm 310 is thus done in order to minimize the greatest amount of unmet demands for cores (i.e. greatest difference between the CDF and allocated number of cores for any given application 220) among the set of programs 210, while ensuring that any given program gets at least its entitled share of the processing cores following such runs of the algorithm for which it demanded 130 at least such entitled share of the cores. Accordingly, all cores 120 of the array 115 are allocated on each run of the process 300 according to applications processing load variations while honoring their contractual entitlements.

To study further details of the process 300, let us consider the cores of the processor 100 to be identified as core #0 through core #(Y-1). For simplicity and clarity of the description, we will from hereon consider an example processor 100 under study with a relatively small number Y of sixteen cores. We further assume here a scenario of relatively small number of also sixteen application programs configured to run on that processor 100, with these applications identified for the purpose of the description herein alphabetically, as application #A through application #P. Note however that the architecture presents no actual limits for the number of cores, applications or their tasks or instances for a given processor 100. For example, instances of processor 100 can be configured a number of applications that is lesser or greater than (as well as equal to) the number of cores.

Following the allocation 310 of the set of cores 115 among the applications 210, for each active application 220 on the processor 100 (that were allocated one or more cores by the latest run of the core allocation algorithm 310), the individual ready-to-execute app-inst:s 240 are selected 320 and mapped 330 to the number of cores allocated to the given application. One schedulable 240 app-inst is assigned per one core 120 by each run of the process 300.

The app-inst selection 320 step of the process 300 produces, for each given application of the set 210, lists 325 of to-be-executing app-inst:s to be mapped 330 to a subset of cores of the array 115 allocated to the given application. For an application allocated n (a positive integer) cores from the array, the n highest priority instances (chosen for execution on the on the upcoming CAP) are included in the list 325 of that application. Note that, as part of the periodic process 300, the selection 320 of to-be-executing app-inst for any given active application (such that was allocated at least one core) is done, in addition to following a chance in allocation 310 of cores among applications, also following a change in app-inst priority list 135 of the given application, including when not in connection to reallocation 310 of cores among the applications. The active app-inst to core mapping 330 is done logically individually for each application, however keeping track of which cores are available for any given application, in particular implementation, by first assigning for each application their respective subsets of cores among the array 115 and then running the mapping 330 in parallel for each application that has new app-inst:s to be assigned to their execution cores.

The app-inst to core mapping algorithm 330 for any application begins by keeping any continuing app-inst:s, i.e., app-inst:s selected to run on the array 115 both before and after the present app-inst switchovers, mapped to their current cores also on the next allocation period. After that rule is met, any newly selected app-inst:s for the application are mapped to available cores. Specifically, assuming that a given application was allocated k (a positive integer) cores beyond those used by its continuing app-inst:s, k highest priority ready but not-yet-mapped app-inst:s of the application are mapped to k next available (i.e. not-yet-assigned) cores within the array 115 allocated to the application. This placing of newly selected app-inst:s, i.e., selected instances of applications beyond the app-inst:s continuing over the switchover transition time, is done by mapping such yet-to-be-mapped app-inst:s in incrementing app-inst ID# order to available cores in incrementing core ID# order. In case that any given application had less than k ready but not-yet-mapped app-inst:s, the highest priority other (e.g. waiting, not ready) app-inst:s are mapped to the remaining available cores among the number of cores allocated to the given application; these other app-inst:s can thus directly begin executing on their assigned cores once they become ready.

Summary of Process Flow and Information Formats Produced and Consumed by Main Stages of the App-Inst to Core Mapping Process:

According to an embodiment of the invention, the production of updated mappings and controls 335, 345, 355 between selected app-inst:s 325 and the processing core slots 120 of the processor 100 by the process 300 (FIG. 3, implemented by controller 140 in FIG. 1) from the Core Demand Figures (CDFs) 130 and app-inst priority lists 135 of the applications 220 of the set 210 (FIG. 2), as detailed above with module level implementation examples, proceeds through the following stages and (intermediate) results (in reference to FIG. 3):

The input data receive (RX) logic subsystem of the processor 100 produces for each application 220 its CDF 130, e.g. an integer between 0 and the number of cores within the array 115 expressing how many concurrently executable app-inst:s 240 the application presently has ready to execute. The information format 130, as used by the core allocation phase of the process 300, is such that logic at the core allocation module 310 repeatedly samples the application CDF bits provided to it by the RX logic subsystem and, based on such samples, forms an application ID-indexed table (per Table 1 below) as a 'snapshot' of the application CDFs as an input for next exercising of the process 300. An example of such format of the information 130 is provided in Table 1 below—note however that in the hardware logic implementation, the application ID index, e.g. for range A through P, is represented by a digital number, e.g. in range 0 through 15, and as such, the application ID # serves as the index for the CDF entries of this array, eliminating the need to actually store any representation of the application ID for the table providing information 130:

TABLE 1

| Application ID index | CDF value |
|---|---|
| A | 0 |
| B | 12 |
| C | 3 |
| ... | ... |
| P | 1 |

Regarding Table 1 above, note that the values of entries shown are simply examples of possible values of some of the application CDFs, and that the CDF values of the applications can change arbitrarily for each new run of the process 300 and its algorithm 310 using snapshots of the CDFs.

Based (in part) on the application ID# indexed CDF array 130 per Table 1 above, the core allocation algorithm 310 of the process 300 produces another similarly formatted application ID indexed table, whose entries 315 at this stage are the number of cores allocated to each application on the processor 100, as shown in Table 2 below:

TABLE 2

| Application ID index | Number of cores allocated |
|---|---|
| A | 0 |
| B | 6 |
| C | 3 |
| ... | ... |
| P | 1 |

Regarding Table 2 above, note again that the values of entries shown are simply examples of possible number of cores allocated to some of the applications after a given run on the algorithm 310, as well as that in hardware logic this array 315 can be simply the numbers of cores allocated per application, since the application ID# for any given entry of this array is knowable from the index # of the given entry in the array 315.

The app-inst selection sub-process 320, done individually for each application of the set 210, uses as its inputs the per-application core allocations 315 per Table 2 above, as well as priority ordered lists 135 of ready app-inst IDs of each given application. Each such application specific list 135 has the (descending) app-inst priority level as its index, and, as a values stored at each such indexed element, the intra-application scope instance ID#, plus an indication of the target core type (e.g. CPU, DSP, GPU or a specified ASP) demanded by the app-inst, as shown in the example of Table 3 below:

TABLE 3

| App-inst priority index # -- application internal (lower index value signifies more urgent app-inst) | App-inst ID # | Target core type (e.g., 0 denotes CPU, 1 denotes DSP, 2 denotes GPU, 3 ... 15 denotes an ASP for a particular function, etc.) |
|---|---|---|
| 0 | 0 | 0 |
| 1 | 8 | 2 |
| 2 | 5 | 2 |
| 3 | 14 | 4 |
| ... | ... | |
| 15 | 2 | 1 |

Notes regarding implicit indexing and non-specific examples used for values per Tables 1-2 apply also for Table 3.

The input data receive (RX) logic writes for each application 220 of the set 210 the intra-app instance priority list 135 per Table 3 to controller 140, to be used as an input for the active app-inst selection sub-process 320, which produces per-application listings 325 of selected app-inst:s, along with their corresponding target core types where applicable. Based at least in part on the application specific active app-inst listings 325, the core to app-inst assignment algorithm module 330 produces a core ID# indexed array 335 indexed with the application and instance IDs, and provides as its contents the assigned processing core ID (if any), per Table 4 below:

TABLE 4

| Application ID -- MSBs of index | Instance ID (within the application of column to the left) -- LSBs of index | Processing core slot ID (value 'Y' here indicates that the given app-inst is not presently selected for execution at any of the cores) |
|---|---|---|
| A | 0 | 0 |
| A | 1 | Y |
| ... | ... | |
| A | 15 | 3 |
| B | 0 | 1 |
| B | 1 | Y |
| ... | ... | |
| B | 15 | 7 |
| C | 0 | 2 |
| ... | ... | ... |
| P | 0 | 15 |
| ... | ... | |
| P | 15 | Y |

Finally, by inverting the roles of index and contents from Table 4, an array 345 expressing to which app-inst ID# each given core of the fabric 110 got assigned, per Table 5 below, is formed. Specifically, the Table 5 format can be formed by using as its index the contents of Table 4 i.e. the core ID numbers (other than those marked 'Y'), and as its contents the app-inst ID index from Table 4 corresponding each core ID# along with, where applicable, the core type demanded by the given app-inst, with the core type for any given selected app-inst being denoted as part of the information flow 325 (FIG. 3) produced from a data array per Table 3. In an alternative implementation, the demanded core type 355 for any given app-inst selected for execution is looked up by the module 330 from a LUT indexed by the app-inst ID#s and providing as its entries the core type values for each app-inst hosted on the given processor 100. The format for the app-inst to core mapping info 345, along with demanded core slot type info 355 (noting that in certain embodiments, the app ID# bits can be used to as such to determine the demanded core type 355), is illustrated in the example below:

TABLE 5

| Core ID index | Application ID | Instance ID (within the application of column to the left) | Core type (e.g., 0 denotes CPU, 1 denotes DSP, 2 denotes GPU, 3 ... 15 denotes an ASP for a particular function, etc.) |
|---|---|---|---|
| 0 | P | 0 | 0 |
| 1 | B | 0 | 0 |
| 2 | B | 8 | 2 |
| ... | ... | ... | ... |
| 14 | F | 1 | 5 |
| 15 | N | 1 | 1 |

Regarding Tables 4 and 5 above, note that the symbolic application IDs (A through P) used here for clarity will in digital logic implementation map into numeric representations, e.g. in the range from 0 through 15. Also, the notes per Tables 1-3 above regarding the implicit indexing (e.g., core ID for any given app-inst ID entry is given by the index of the given entry, eliminating the need to store the core IDs in this array) apply for the logic implementation of Tables 4 and 5 as well.

By comparing Tables 4 and 5 above, it is seen that the information contents at Table 4 are the same as at Table 5; the difference in purposes between them is that while Table 5 gives for any core slot 120 its active app-inst ID#345 to process, along with the demanded core type 355, Table 4 gives for any given app-inst its processing core slot 335 (if any at a given time).

Note further that when the app-inst to core placement module 330 gets an updated list of selected app-inst:s 325 for one or more applications 220 (following a change in either or both of core to application allocations 315 or app-inst priority lists 135 of one or more applications), it will be able to identify from Tables 4 and 5 the following:
  I. The set of activating, to-be-mapped, app-inst:s, i.e., app-inst:s within the selected app-inst lists 325 not mapped to any core by the previous run of the placement algorithm 330. This set I can be produced by taking those app-inst:s from the updated selected app-inst lists 325, per Table 4 format, whose core ID# was 'Y' (indicating app-inst not active) in the latest Table 4;
  II. The set of deactivating app-inst:s, i.e., app-inst:s that were included in the previous, but not in the latest, selected app-inst lists 325. This set II can be produced by taking those app-inst:s from the latest Table 4 whose core ID# was not 'Y' (indicating app-inst active) but that were not included in the updated selected app-inst lists 325; and
  III. The set of available cores, i.e., cores 120 that in the latest Table 5 were assigned to the set of deactivating app-inst:s (set II above).

The placer module 330 uses the above info to map the active app-inst:s to the cores of the array 115 in a manner that keeps the continuing app-inst:s executing on their present cores, thereby maximizing utilization of the core array for processing the user applications 220. Specifically, the placement algorithm 330 maps the individual app-inst:s 240 within the set I of activating app-inst:s in their increasing app-inst ID# order for processing at core instances within the set III of available cores, first by placing the activating app-inst:s from set I (in their increasing app ID# order, and secondly in their increasing inst # order) to any core slots of set III (in their increasing core ID# order) that are presently configured to the core type 355 matching the execution core type associated with the given app-inst from set I being placed at the given turn of this algorithm. In embodiments where the app ID# of an app-inst can be used to determine its target core type 355, through this activating app-inst to available core slot type matching phase of the placement algorithm, the app-inst:s from set I for each given app ID# are thus mapped to cores of set III that presently are assigned for inst:s of that same app ID# or inst:s of any other app # with same demanded core type.

Thereby, regarding placement of activating app-inst:s, the placement algorithm 330 seeks to minimize the amount of core slots for which the activating app-inst (from set I as discussed above) demands 355 a different execution core type than the deactivating (from set II as discussed above) app-inst did. I.e., the placer will, to the extent possible, place activating app-inst:s to such core slots where the deactivating app-inst have the same execution core type as the activating app-inst:s. E.g., activating app-inst:s demanding the DSP type execution core will be placed to the core slots where the deactivating app-inst:s also had run on DSP type cores, including in cases where the activating and de-activating app-inst:s are from different applications (assuming the activating and de-activating app-inst:s are able to execute on the same DSP core subtype). Accordingly, this sub-step in placing the activation app-inst:s to their target core slots uses as one of its inputs the new and preceding versions of (the core slot ID indexed) app-inst ID and core type arrays per Table 5, to allow matching, as much as possible, activating app-inst:s (from set I) and the available core slots (from set III) according to the demanded core type 355.

The references [1]-[7] provide further reference specifications, use cases and context for aspects and embodiments of the invented systems and methods. Specifically, the references [1]-[7] provide applications context and implementation techniques for manycore processors with embedded hardware operating system, dynamic memory access and billing subsystems, enabling application program load driven optimization of manycore processing resource allocation to maximize the value-add of data processing throughput across a set of client programs sharing a given pool of processing resources. The references [1]-[3] also provide techniques for using the presence and/or volume of available input data for instances of a set of application-tasks hosted on a given manycore processor as a basis for optimal allocation and assignment of the cores slots of the given manycore processor among the its local app-task instances.

To the disclosures in the references [1]-[7] to this specification adds, inter alia, features whereby the cores of manycore array, when necessary, are dynamically reconfigured for a type (e.g. CPU, DSP, GPU, ASP, etc.) that matches the nature of the processing task (miscellaneous data processing, computationally intensive, data intensive, algorithm specific, etc.) assigned to any given core for any given period of time, to enable optimally efficient processing of the program tasks selected for execution on the manycore array at any given time.

This description and drawings are included to illustrate architecture and operation of practical embodiments of the invention, but are not meant to limit the scope of the invention. For instance, even though the description does specify certain system parameters to certain types and values, persons of skill in the art will realize, in view of this description, that any design utilizing the architectural or operational principles of the disclosed systems and methods, with any set of practical types and values for the system parameters, is within the scope of the invention. For instance, in view of this description, persons of skill in the art will understand that the disclosed architecture sets no actual limit for the number or types of cores in a given system, or for the maximum number of applications or tasks to execute concurrently. Moreover, the system elements and process steps, though shown as distinct to clarify the illustration and the description, can in various embodiments be merged or combined with other elements, or further subdivided and rearranged, etc., without departing from the spirit and scope of the invention. Finally, persons of skill in the art will realize that various embodiments of the invention can use different nomenclature and terminology to describe the system elements, process phases etc. technical concepts in their respective implementations. Generally, from this description many variants will be understood by one skilled in the art that are yet encompassed by the spirit and scope of the invention.

What is claimed is:

1. A system for assigning one or more application instances that are associated with a respective application in a plurality of applications to an array of processor cores of configurable types at least in part based on information specifying type of processing resources demanded for execution of one or more of the plurality of applications, the system comprising:
    a core fabric comprising the array of processor cores, each processor core configured to a type of processing resource optimal for executing its currently assigned application from the plurality of applications;
    a hardware controller for periodically assigning the one or more application instances for execution on the array of processor cores for an execution interval at least in part based on processing demands associated with each of the plurality of applications,
    wherein the hardware controller assigns, for at least some of the execution intervals, the one or more application instances to the array of processor cores by:
        identifying a present allocation of application instances currently assigned for execution on the array of processor cores in a current execution interval;
        determining a new allocation of application instances to be assigned to the array of processor cores at a next execution interval;
        identifying one or more application instances from the new allocation that are not present in the present allocation, with this set of application instances referred to as activating application instances;
        identifying one or more application instances from the present allocation that are not present in the new allocation, with this set of application instances referred to as deactivating application instances;
        identifying one or more processor cores in the array of processor cores that are currently assigned to the deactivating application instances, with this set of processor cores referred to as available processor cores;
        assigning the activating application instances to the available processor cores for execution in the next execution interval by matching, to the extent possible, a currently configured type of processor core in the available processor cores with the type of processing resources as specified by the activating application instances; and
        when at least one of the activating application instances cannot be matched with any of the available processor cores, reconfiguring at least one of the available processor cores from its currently configured type to a type of processing resource as specified by the at least one activating application instance.

2. The system of claim 1, wherein the processing demands associated with each of the plurality of applications specifies a type of processor core demanded by each application.

3. The system of claim 1, wherein the reconfiguring of the one or more of the available processor cores is performed by the hardware controller.

4. The system of claim 1, wherein the hardware controller, when assigning the one or more application instances to the array of processor cores for the next execution interval, keeps, in the array of processor cores, any given such instance of the applications that is present in both the present allocation and the new allocation assigned on the next execution interval to that same core of the array to which the given instance of the applications was assigned on the current execution interval.

5. The system of claim 1, wherein the processing demands associated with each of the plurality of applications is based on:
    i) an amount of input data available to each application for processing,
    ii) a number of tasks of each application which are presently processing the available input data, or
    iii) a number of application instances of each application which are presently processing the available input data.

6. The system of claim 1, wherein each of the plurality of applications is one of: a task, a function, a procedure, a thread, or an execution instance of a software program.

7. The system of claim 1, wherein a processor core in the available processor cores is reconfigured, by the hardware controller, to provide a direct hardware logic implementation of the activating application instance assigned for execution by the processor core.

8. The system of claim 7 wherein the direct hardware logic implementation directly performs an information processing function of the activating application instance without a need for executable software instructions.

9. A method for assigning one or more application instances that are associated with a respective application in a plurality of applications to an array of processor cores of configurable types at least in part based on information specifying type of processing resources demanded for execution of one or more of the plurality of applications, wherein each processor core is configured to a type of processing resource optimal for executing its currently assigned application from the plurality of applications the method comprising a set of steps including:
    periodically assigning the one or more application instances for execution on the array of processor cores for an execution interval at least in part based on processing demands associated with each of the plurality of applications, wherein, for at least some of the execution intervals, the assigning of the one or more application instances to the array of processor cores is performed by:
identifying a present allocation of application instances currently assigned for execution on the array of processor cores in a current execution interval;
determining a new allocation of application instances to be assigned to the array of processor cores at a next execution interval;
identifying one or more application instances from the new allocation that are not present in the present allocation, with this set of application instances referred to as activating application instances;
identifying one or more application instances from the present allocation that are not present in the new allocation, with this set of application instances referred to as deactivating application instances;
identifying one or more processor cores in the array of processor cores that are currently assigned to the deactivating application instances, with this set of processor cores referred to as available processor cores;
assigning the activating application instances to the available processor cores for execution in the next execution interval by matching, to the extent possible, a currently configured type of processor core in the available processor cores with the type of processing resources as specified by the activating application instances; and
when at least one of the activating application instances cannot be matched with any of the available processor cores, reconfiguring at least one of the available processor cores from its currently configured type to a type of processing resource as specified by the at least one activating application instance.

10. The method of claim 9, wherein the processing demands associated with each of the plurality of applications specifies a type of processor core demanded by each application.

11. The method of claim 9, wherein the reconfiguring of the one or more of the available processor cores is handled by a hardware controller performing the method.

12. The method of claim 9, wherein, when assigning the one or more application instances to the array of processor cores for the next execution interval, the method keeps, in the array of processor cores, any given such instances of the applications that is present in both the present allocation and the new allocation assigned on the next execution interval to that same core of the array to which the given instance of the applications was assigned on the current execution interval.

13. The method of claim 9, wherein the processing demands associated with each of the plurality of applications is based on:
i) an amount of input data available to each application for processing,
ii) a number of tasks of each application which are presently processing the available input data, or
iii) a number of application instances of each application which are presently processing the available input data.

14. The method of claim 9, wherein each of the plurality of applications is one of: a task, a function, a procedure, a thread, or an execution instance of a software program.

15. The method of claim 9, wherein the method is performed by a hardware controller without a need for executable software instructions.

16. The method of claim 9, wherein a processor core in the available processor cores is configured, by a controller performing the method, to provide a direct hardware logic implementation of the activating application instance assigned for execution by the processor core.

17. The method of claim 16 wherein the direct hardware logic implementation directly performs an information processing function of the activating application instance without a need for executable software instructions.

* * * * *